United States Patent [19]

McAloon et al.

[11] Patent Number: 4,678,700

[45] Date of Patent: Jul. 7, 1987

[54] FIBROUS COMPOSITE MATERIALS

[75] Inventors: Kevin T. McAloon; Allan T. Brew, both of Cheshire, England

[73] Assignee: Imperial Chemical Industries PLC, London, England

[21] Appl. No.: 738,647

[22] Filed: May 28, 1985

[30] Foreign Application Priority Data

Jun. 6, 1984 [GB] United Kingdom ................. 8414439

[51] Int. Cl.$^4$ ........................ B32B 27/14; B32B 9/00; C03B 37/00
[52] U.S. Cl. .................... 428/198; 428/408; 428/283; 428/324; 428/360; 428/367; 428/920; 428/307.3; 428/288; 428/414; 428/500; 428/448; 428/450; 428/921; 428/457; 428/429; 428/426; 428/537.1; 428/537.5; 162/3; 427/215
[58] Field of Search .................... 428/408, 283, 307.3, 428/244, 920, 262, 288, 289, 198, 324, 360, 367; 427/215

[56] References Cited

U.S. PATENT DOCUMENTS

| | | | |
|---|---|---|---|
| 4,366,203 | 12/1982 | Briggs | 428/304.4 |
| 4,366,204 | 12/1982 | Briggs | 428/304.4 |
| 4,391,873 | 7/1983 | Brassell et al. | 428/920 X |
| 4,421,815 | 12/1983 | Briggs et al. | 428/198 |
| 4,442,164 | 4/1984 | Briggs et al. | 428/283 |
| 4,472,478 | 9/1984 | Briggs et al. | 428/283 |
| 4,476,181 | 10/1984 | Briggs et al. | 428/920 X |
| 4,477,094 | 10/1984 | Yamamoto et al. | 428/920 X |
| 4,532,176 | 7/1985 | Briggs et al. | 428/288 |
| 4,543,287 | 9/1985 | Briggs et al. | 428/288 |

Primary Examiner—P. C. Ives
Attorney, Agent, or Firm—Cushman, Darby & Cushman

[57] ABSTRACT

A fibrous composite material comprising carbon fibers and chemically delaminated vermiculite lamellae and production of the material by applying a suspension (preferably an aqueous suspension) of the lamellae to carbon fibers and removing the liquid medium from the suspension. The composite material is useful for the insulation and fire-protection of substrates.

13 Claims, No Drawings

FIBROUS COMPOSITE MATERIALS

This invention relates to fibrous materials and particularly to fibrous composite materials comprising fibres which have been coated with or embedded in an inorganic material to upgrade the fibres, and to the production and use of the fibrous composite materials.

Fibres and fibrous materials made from them are notoriously susceptible to damage or destruction by fire. Fibres, whether natural or man-made fibres, comprising organic materials, for example wool, cotton, rayon, cellulose acetate, polyesters, polyamides and lignocellulosic fibres are generally readily flammable. Fibres comprising inorganic materials, for example glass fibres, are nonflammable but are generally low melting materials so that while they are nonflammable they melt in a fire situation.

Carbon fibres are not combustible in the sense of flame propogation or burning with flames but are destroyed by oxidative degradation in a fire and are commonly regarded as combustible fibres. Since they do not burn with flaming and do not propogate flames, carbon fibres offer some advantage over the common combustible fibres in a heat situation but their heat performance leaves something to be desired.

It would clearly be advantageous, for example in the textile, furnishing and perhaps especially in building industries, if carbon fibres and particularly composites containing carbon fibres, could be upgraded to improve their heat performance e.g. fire resistance and treatments have been proposed for achieving this desirable result by coating the fibres with or embedding them within a fire-resistant material or by incorporating a fire-resistant material in the fibre structure. Hitherto, no satisfactory solution to the problem has been achieved; in particular no solution has been found which combines satisfactory heat performance of carbon fibre composites with acceptable expense while retaining the desirable properties of the fibres and materials made from them.

According to the present invention there is provided a fibrous composite material comprising carbon fibres and chemically delaminated vermiculite lamellae. Preferably the fibrous composite material comprises at least 10% by weight and preferably at least 20% by weight of the carbon fibres. The carbon fibres may, if desired, be mixed with other combustible and/or non-combustible fibres.

There is also provided a method for the manufacture of the fibrous composite material by applying chemically delaminated vermiculite lamellae to carbon fibres, preferably from suspension in an inert carrier liquid, usually an aqueous medium, and then removing the carrier liquid.

The method for the manufacture of the composite material is also a method of upgrading the fire-performance of carbon fibres.

By "vermiculite" we mean all materials known mineralogically and commercially as vermiculite, including the chlorite-vermiculites.

By the term "chemically delaminated vermiculite lamellae" as used throughout this specification we mean tiny particles of vermiculite obtained by chemically delaminating the layer mineral into particles or platelets having a thickness of less than 0.5 micron, usually less than 0.05 micron and preferably less than 0.005 micron, and having an aspect ratio (i.e. length or breadth divided by thickness) of at least 10, preferably at least 100 and more preferably at least 1000, for example 10,000.

The fibrous composite materials of the invention may have a wide variety of forms and the vermiculite lamellae may be present in the composite as a coating on the individual fibres of a composite, as a layer in which the fibres are embedded or as a coating or facing layer on one or both sides of a fibrous material such as a woven or non-woven fabric or a felt, or as an inner layer between layers of the fibrous material. By way of illustration only and without in any way restricting the scope of the present invention, the following product forms are included within the term fibrous composite material:

1. Individual carbon fibres coated with a layer of lamellae.
2. A layer of carbon fibres faced on one or both sides with a layer of lamellae.
3. Strands comprising multiple filaments, e.g. 100 to 1000 filaments, having lamellae coated onto the individual filaments and/or onto the strands.
4. Rovings comprising multiple strands twisted, doubled or plied together, having lamellae coated onto the filaments and/or the strands and/or onto the rovings.
5. A layer of carbon fibres bonded together by lamellae.
6. Fibrous blocks comprising a mass of carbon fibres cemented together at their points of contact by the lamellae of the layer minerals and preferably also coated individually or in groups with the lamellae. The fibres may be randomly oriented throughout the blocks to provide a lightweight block of open three-dimensional structure exhibiting good heat and sound insulation properties.
7. A multi-layer structure comprising two or more layers of a composite material such as a coated or impregnated fabric or felt laminated together using a conventional adhesive or preferably using the lamellae of the layer mineral as the adhesive. Heat-resistant boards as are commonly used for work surfaces in kitchens are a specific example of such a structure.

It will readily appreciated that each of the above product forms comprising a layer of carbon fibres may comprise a multi-layer structure of fibres and that the fibre layers may comprise loose fibres or may be a woven, knitted, needle-punched, felted or otherwise unified structure. Furthermore, it is to understood that in any of the product forms of the fibrous composite material the fibres may be continuous (filamentary) or discontinuous (staple), or agglomerates of fibres.

A further product form within the term "fibrous composite material" as used herein is a material in which the carbon fibers are present in the form of a composite with an organic polymer or resin, for example a carbon fibre/epoxy resin composite or a carbon fibre/polyether ketone polymer. It is to be understood that a carbon fibre/polymer composite coated and/or impregnated with chemically delaminated vermiculite lamellae is included as a form of a fibrous composite material comprising carbon fibrous and chemically delaminated vermiculite lamellae and that a carbon fibre/polymer composite is included as a form of a mass of carbon fibres.

The amount by weight of lamellae applied to the mass of fibrous material may vary within wide limits depending for example upon the intended temperature duty of the composite, the desired flexibility of the composite, the required degree of structural integrity of the composite before and after it has been subjected to high temperatures and whether the lamellae are applied as a coating or a facing for the fibrous material. In general, increasing the loading of lamellae on the fibrous material will increase the heat-performance of the fibres and the thermal conditions which the composite will withstand. We have observed, however, that in general very thin layers of lamellae, for example less than 1 micron thickness, are all that is required to upgrade the fire-performance and the high-temperature performance of the fibres. As a guide only, the loading of the layer mineral on the fibres of the composite will usually be from 10% to 200% by weight, typically at least 30% by weight, of the fibres. Amounts of the layer mineral greater than these may be used and indeed the composite may comprise as much or even more layer mineral than fibres such that the composite is in effect a fibre-reinforced layer of lamellae, for example where high flexibility in the composite is unnecessary or undesirable; the amount of fibres in such a structure should however be at least 15% by weight of the composite.

The amount of lamellae applied to the carbon fibres will affect the degree of damage suffered by the fibres when the composite material is exposed to a flame or to high temperatures. In most practical applications of the invention the carbon fibres of the composite material are likely to be damaged or even completely destroyed by a flame or high temperatures, but in spite of this the fire-performance of the composite material is not seriously impaired, especially the fire-barrier and flame-resistance properties of the composite material.

It is known that thin sheets or papers can be formed from suspensions of lamellae of vermiculite, and that such sheets can be used to face combustible organic foam materials for fire-protection, such a product being described for example in United Kingdom Patent Specification No. 2,007,153. We have observed, however, that when exposed to a fire such sheets or papers tend to curl and crack and thus do not satisfactorily retard the spread of flames and do not provide an adequate fire-barrier to protect combustible substrates on which they are used as facing materials. By contrast, and surprisingly, we have found that when the fibrous composite materials of the invention are exposed to a fire they do not curl or crack even when the coating layer of lamellae is extremely thin. Thus the fibrous composite materials of the invention provide better fire-barriers than sheets or papers comprising chemically delaminated vermiculite lamellae alone.

The fibrous composite materials are made by applying the vermiculite lamellae to a suitable fibrous substrate. Usually the lamellae will be applied from a suspension in a carrier liquid which may be for example an organic liquid, or water or another aqueous medium. Conveniently the suspension obtained in the process used for the chemical delamination of the vermiculite can be used directly to form the fibrous composite material. If desired, however, lamellae in the form of a free-flowing dry powder (as described for example in our European Pat. No.9.311) may be suspended in any suitable carrier liquid for application to the fibrous substrate. The solids content (lamellae) of the suspension is not critical and may vary over a wide range. Any stable suspension may be employed. In addition to the chemically delaminated vermiculite, the suspension may contain additives such as other layer-minerals, fillers and organic polymers. Typically, the solids content of the suspension will be up to 40% by weight of the suspension but may for the production of thin coatings be only a few %, say 2% by weight. Preferably the solids content of the suspension for most applications will be from 10% to 20% by weight although suspensions of higher solids content for example up to 50% by weight (at which solids content thesuspension may be a paste), may be preferred for making fibrous blocks. After application of the suspension to the fibrous substrate, the carrier liquid is removed, usually be evaporation, to leave the vermiculite lamellae deposited, preferably as a fairly coherent layer, on the fibrous substrate. If desired excess carrier liquid may be squeezed from or allowed to drain from the composite material prior to heating the composite material to remove residual carrier liquid. The temperature at which the suspension is applied to the fibrous substrate can be any temperature up to or even greater than the boiling point of the carrier liquid, providing of course that the fibres are stable at such temperatures. We prefer to avoid temperatures close to and especially above the boiling point of the carrier liquid since unless care is exercised a rapid evolution of gas during removal of the carrier liquid may have an adverse effect upon the properties of the composite material.

The suspension (or slurry as it may also be termed) can be applied to the fibrous substrate by any known technique, including brush-coating, 'nip'-coating, roller-coating, dip coating and impregnation or, in the case of loose fibres by co-depositing the fibres and the vermiculite lamellae. It is a simple matter for the operator to choose a suspension strength and an application technique appropriate to applying the desired loading of lamellae onto any particular fibrous substrate.

The application technique employed for applying the lamellae to a fibrous substrate may vary according to the desired final form of the composite material, being different perhaps for coating individual fibres, strands and rovings than for coating woven, felted or otherwise unified fibrous materials, or for producing fibrous blocks.

If desired, the suspension of lamellae may be gasified to produce a stable froth for application to the fibrous substrate so that the layer mineral content of the resulting composite material may be present at least in part in the form of a cellular (rigid foam) matrix. Conversion of a suspension of vermiculite lamellae to rigid foams is described, for example, in United Kingdom Patent Specification No.1,585,104.

A technique applicable to a specific product form arises in the case where the fibrous substrate of the composite material is a mat of fibres produced by a wet-lay or paper-making technique in which the fibres are suspended in a carrier liquid, usually water, and the fibre mat is laid down from the suspension. In such a case the suspension of fibres may include the lamellae by suspending the fibres in a suspension of lamellae, by suspending lamellae in a suspension of fibres or by mixing suspensions of fibres and lamellae. In this technique, a small amount of an organic binder, for example a rubber latex or polymer latex is often included in the suspension or as a post-treatment to afford handleability to the resulting mat, the organic binder subsequently being removed if desired by burning (provided, of course, that the fibres will withstand the burning conditions).

The fibrous composite materials of the invention exhibit improved fire-performance and high temperature performance compared with the corresponding material made of the untreated carbon fibres although the K-factor of the treated fibres will usually be slightly higher than that of the untreated fibres.

In addition to conferring good fire resistance and thermal performance to the fibrous composite materials, chemically delaminated vermiculite when deposited from suspensions exhibits excellent self-adhesion properties. Upon removal of the water (or other carrier liquid) from suspensions of lamellae of chemically delaminated vermiculite, the lamellae mutually adhere together to form a relatively strong layer of vermiculite and fibrous composite materials containing vermiculite lamellae benefit from this self-adhesion characteristic of the applied lamellae in that the strength and durability of the composite is enhanced. The deposited vermiculite lamellae may act as an adhesive to bond the fibres of the fibrous substrate together (for example where the fibres are not already bonded together with a polymeric binder or resin) and/or to bond the composite to other materials for example to form laminates.

In addition to upgrading the fire resistance and high temperature performance of the fibres to which the coating layer of lamellae is applied, the coating may afford the further advantage of conferring vapour-barrier characteristics and particularly water vapour-barrier characteristics on the fibrous materials. Films deposited from suspensions of vermiculite lamellae have low vapour transmission coefficients, especially low water-vapour transmission coefficients such that the fibrous composite materials of the invention can be used as barrier layers to inhibit the ingress of wate vapour into materials such as foams (where the ingress of water can impair the insulation value of the foam on ageing) or water degradable materials.

If desired there may be incorporated in the composite material and especially in the surface thereof, flame-retardant additives such as halogenated compounds, antimony trioxide aluminium trihydrate, borates and phosphates.

The fibrous composite materials described hereinbefore and comprising unmodified coatings comprising chemically delaminated vermiculite lamellae are useful materials for a wide variety of applications. However, in appliction where the composite material is liable to be subjected to liquid water, it is preferred to modify the coatings to confer improved water-stability upon the composite. Unmodifed coatings tend to disintegrate in liquid water; however, they are readily modified to make them stable in liquid water. Composite materials comprising vermiculite lamellae can be made water stable by treatment with a solution, for example a saturated solution, of a magnesium salt such as magnesium chloride, by treatment with ammonia or the vapour of an alkylamine, or by incorporating a water-stability improver in the suspension of lamellae applied to the fibrous substrate, as is described, for example, in our European Pat. No. 9.310. Suitable water-stability improvers are particulate compounds sparingly soluble in water and having a basic reaction in water, for example calcium oxide and magnesium oxide.

Magnesium oxide is the preferred water-stability improver and in addition to conferring water-stability to the composite material, this additive enhances the strength of the composites materials. Magnesium oxide is a particularly desirable additive to gasified (frothed) vermiculite suspensions used to form the composite material in that it additionally enhances the compressive strength of the cellular (rigid foam) vermiculite matrix of the composite material. The amount of water-stability improver will usually be up to 15% by weight, typically 10% by weight based on the lamellae.

A further method of conferring water-stability upon the composite materials resides in incorporating a small amount of a urea-formaldehyde or melamin-formaldehyde resin in the vermiculite suspension and subsequently heating the composite material during or after drying to effect a cure of the vermiculite in the material. Alternatively a source of a basic substance such as ammonia or ammonia ions, preferably urea, may be incorporated in the suspension whereby liberation of the basic substance (ammonia) effects a cure of the vermiculite and renders the composite material water-stable.

Water-proofing of the composite materials, as opposed to improving their stability in liquid water, can be effected by incorporating a silicone polymer precursor in the suspension of lamellae prior to application of the suspension to the fibrous material, and treating the resulting composite material with an acidic gas in the presence of water to polymerize the precursor and form a silicone polymer in the composite material. Thus, for example sodium methyl siliconate can be incorporated in the suspension and the resulting composite material treated with carbon dioxide in the presence of water (during drying of the composite material or subsequent to drying the composite and re-wetting it). The amount of silicone polymer precursor added to the suspension will usually be up to about 5% by weight, typically about 2% by weight, based on the lamellae.

Any suspension of chemically delaminated vermiculite lamellae may be used to form the composite materials of the invention. Chemical delamination of layer minerals is well known and any of the known chemical delamination processes may be employed including the processes described in United Kingdom Patent Specifications Nos. 1,016,385; 1,076,786; 1,119,305 and 1,585,104 and by Baumeister and Hann in "Micron" 7 247 (1976). Preferably the suspension of chemically delaminated vermiculite is subjected to a wet-classification treatment in which larger particles of vermiculite are removed, as is described in United Kingdom Patent specification No. 1,593,382. For use in the process of the present invention the suspension preferably is wet-classified to a particle size (platelets) below 50 microns, so, that the suspension exhibits collodial properties. Typical suspensions of vermiculite lamellae obtained by the process described in United Kingdom Specification No. 1,585,104, wet-classified to particles of below 50 microns comprise about 40% of particles in the size range 0.4 to 5.0 microns. Such suspensions are the preferred suspensions for making the fibrous composite materials of the present invention. The suspension may, if desired, contain one or more other layer minerals and/or fillers.

The fibrous composite materials of the invention can be used in any applications where the corresponding fibrous materials are commonly employed, and additionally they enable carbon fibres to be used in applications where hitherto those fibres have been considered unusable because they exhibit unsatisfactory fire performance.

Included among the many uses of the fibrous composite materials of the invention is the fire-protection of flammable and/or low-melting materials such as rubber and plastic foams, sheets and films, aluminum wood, paper, cardboard, glass, and the like. For such use, the fibrous composite material may be provided as a loose covering not bonded to the flammable substrate but we have found that best results are obtained if the composite is bonded to and laminated with the substrate. The composite may be laminated with the substrate using conventional adhesive although in most cases the adhesive nature of the vermiculite lamellae deposited from suspension enables another adhesive to be dispensed with. Thus for example application of the wet composite (i.e. the fibrous substrate plus vermiculite suspension) will often result in a satisfactory bonding of the composite to the substrate. Alternatively, the composite may be formed in situ on the substrate to be protected, for example by coating the substrate with vermiculite suspension and then pressing a fibrous material onto (and preferably into) the wet vermiculite layer; if desired a further layer of vermiculite may then be applied over the fibrous material to 'face' the laminate with vermiculite lamellae.

The composite material may if desired contain other substances, e.g. sizes, lubricants and binders on the fibres, or conventional fire retardant additives. As stated hereinbefore, the fibres may be present in the form of a composite with an organic polymer or resin.

The fibrous composite materials are also useful in applications which do not specifically require fire-retardance and good thermal properties, for example as reinforcement layers for organic and inorganic materials, e.g. polymers, rubbers, plastics and cements.

The invention is illustrated but in no way limited by the following Example in which the following general procedure was used to prepare the vermiculite suspension.

Preparation of Vermiculite Suspensions 150 parts of vermiculite ore (Mandoval micron grade, ex-South Africa) are agitated with saturateds sodium chloride solution in 1:2 ratio by weight in a tank for 30 minutes at 80° C. This suspension is then centrifuged and washed with deionised water. The wet cake is transferred to a second tank where the vermiculite is stirred with 1.5N n-butylamine hydrochloride (2:1 liquid:solid ratio) for 30 minutes at 80° C. This suspension is then centrifuged and washed with deionised water before transferring the wet cake to a swelling tank in which the vermiculite is stirred with deionised water. After swelling, the suspension contains approximately 20% solids and the particles are random sized in the range 300–400 micron. This suspension is then passed through a stone-type mill which reduces approximately 50% of the particles to platelets of size less than 50 microns. This milled suspension is classified in a weir-type centrifugal classifier and the lighter particles with sieve size less than 50 micron are collected for use. Analysis of this 18–21% solids suspension by photosedimentometer and disc centrifuge reveals that approximately 40% of the particles have a size ("equivalent spherical diameter") of 0.4–1.0 micron. The solids content of the suspension is readily adjusted by adding water to it or removing water from it.

EXAMPLE

Samples of a carbon fibre tissue of weight 30 g/m$^2$ were treated with a suspension (18% by weight solids) of chemically delaminated vermiculite as follows:

I. A sample of the tissue was roller-coated/impregnated on one side with the vermiculite suspension and dried. The add-on of vermiculite (in the dried product) was 30 g/m$_2$, this providing a coated tissue of 50% by weight carbon fibres and 50% by weight vermiculite.

II. A second sample of the tissue was coated/impregnated on one side with the vermiculite suspension and dried. The add-on of vermiculite was 60 g/m$^2$.

III. A third sample of the tissue was impreganted/coated on both sides by dipping in the suspension and dried. The add-on of vermiculite was 30 g/m$^2$.

IV. A fourth sample of the tissue was impregnated/coated by dipping in the suspension and dried. The add-on of vermiculite was 60 g/m$^2$.

Each of samples I to IV had good handle properties and was of good appearance. A corner of each sample was reverse-folded to failure to test the adhesion of the vermiculite to the fibres; in each case the composite material snapped before any visible delamination of the vermiculite coating was observed.

A narrow strip was cut from each of samples I to IV and held in the flame from a Bunsen burner. In each case a visible, white smoke but no flaming was observed. Each sample showed no tendency towards ignition or flame propagation and though embrittled remained intact for a period of 5 mins after which time it was withdrawn from the Bunsen burner flame. For purposes of comparison a strip of the untreated tissue was held in the Bunsen burner flame. Again no flaming or flame propogation was observed but a hole was burned through the sample in the Bunsen burner flame after about 4 minutes.

Each of samples I to IV was then subjected to a severe fire that in which it was placed vertically in the horizontal flame from a propane torch. The flame temperature at the location of the sample was approx. 1350° C. Initially, each sample liberated a white smoke but no sign of flaming was observed. The torch flame was extinguished after 5 minutes and it was noted that each of sample I to IV remained intact at the end of the 5 minutes test.

In the case of sample I and II (coated on one side only) which were located in the torch flame with the coated side towards the flame, it was observed that the carbon fibres on the back (uncoated) face of the sample in the region of direct flame impingement were "burned away" by oxidation but the flame did not penetrate the sample. Samples III and IV (dip-coated on both sides) were examined under a microscope at the end of the test and it was observed that while there was some evidence of destruction of fibres at the center of the 'burn circle', carbon fibres still remained over a large proportion of the 'burn circle'. The torch flame did not penetrate the sample.

For purposes of comparison a sample of the untreated tissue was subjected to the propane torch flame test. The fibres were rapidly destroyed and the flame penetrated the tissue in about 20 seconds.

We claim:

1. A fibrous composite material consisting essentially of carbon fibres and lamellae of chemically delaminated vermiculite wherein the fibres comprise at least 10% by weight of the composite.

2. A fibrous composite material as claimed in claim 1 comprising at least 20% by weight of the carbon fibres.

3. A fibrous composite material as claimed in claim 1 comprising at least 20% by weight of the vermiculite lamellae.

4. A material as claimed in claim 1 wherein the loading of the vermiculite lamellae is up to 100% by weight based on the fibres.

5. A material as claimed in claim wherein the vermiculite lamellae are substantially all of the maximum dimension below 50 microns.

6. A material as claimed in claim 1 wherein the fibrous material comprises individual fibres.

7. A material as claimed in claim wherein the fibres are present in the form of a layer of fibrous material.

8. A material as claimed in claim 1 in the form of a block of randomly oriented fibres bonded together at their points of contact by the vermiculite lamellae.

9. A fibre-reinforced polymeric material as claimed in claim 1 wherein the fibre reinforcement is a fibrous composite material.

10. A material as claimed in claim 1 which additionally comprises a water-stability improver.

11. A material as claimed in claim 1 wherein the vermiculite is present in the form of a dry, rigid foam.

12. An article of manufacture protected from damage by heat or flame comprising a flammable and/or low-melting substrate and a fibrous composite material comprising carbon fibers and lamellae of chemically delaminated vermiculite wherein said fibrous composite material is provided as a loose covering not bonded to said substrate.

13. An article of manufacture protected from damage by heat or flame comprising a flammable and/or low-melting substrate and a fibrous composite material comprising carbon fibers and lamellae of chemically delaminated vermiculite wherein said fibrous composite material is bonded to and laminated with said substrate.

* * * * *